(12) United States Patent
Tsao

(10) Patent No.: US 7,734,778 B2
(45) Date of Patent: Jun. 8, 2010

(54) DISTRIBUTED INTELLIGENT VIRTUAL SERVER

(75) Inventor: Sheng (Ted) Tai Tsao, San Jose, CA (US)

(73) Assignee: Sheng Tai (Ted) Tsao, San Jose, CA (US)

( * ) Notice: Subject to any disclaimer, the term of this patent is extended or adjusted under 35 U.S.C. 154(b) by 930 days.

(21) Appl. No.: 10/116,511

(22) Filed: Apr. 5, 2002

(65) Prior Publication Data
US 2003/0191838 A1 Oct. 9, 2003

(51) Int. Cl.
*G06F 15/173* (2006.01)
(52) U.S. Cl. .................. 709/225; 709/222; 709/223; 709/226; 709/227; 709/228
(58) Field of Classification Search .......... 709/225, 709/226, 227–228, 222
See application file for complete search history.

(56) References Cited

U.S. PATENT DOCUMENTS

| | | | | |
|---|---|---|---|---|
| 6,108,703 | A * | 8/2000 | Leighton et al. | 709/226 |
| 6,449,647 | B1 * | 9/2002 | Colby et al. | 709/226 |
| 6,654,807 | B2 * | 11/2003 | Farber et al. | 709/225 |
| 6,816,905 | B1 * | 11/2004 | Sheets et al. | 709/226 |
| 6,857,012 | B2 * | 2/2005 | Sim et al. | 709/222 |
| 7,047,300 | B1 * | 5/2006 | Oehrke et al. | 709/226 |
| 7,068,597 | B1 * | 6/2006 | Fijolek et al. | 370/230 |
| 7,225,464 | B2 * | 5/2007 | Satyavolu et al. | 726/10 |
| 2001/0052016 | A1 * | 12/2001 | Skene et al. | 709/226 |

* cited by examiner

*Primary Examiner*—Tonia L. Dollinger
*Assistant Examiner*—Kyung H Shin

(57) ABSTRACT

An intelligent distributed virtual server for providing distributed services to a plurality of clients, including one or more servers units, each server units storing data and providing services for accessing by one or more clients; a switch for connecting the clients to the server units and to provide a communication link; and a distribution control station connected to the clients and the server units via the switch, wherein the distribution control station receives a request for a service from a client, and automatically, selectively establishes a data link between that client and an server unit, which stores the requested data and provides services, such that the server unit provides the data stream to the client via the communication link, independent of other server units. The capacity of the intelligent distributed virtual server can be dynamically expanded without interrupt the normal server operation. Due to the non-shared accessing between server units, it represents a more efficient model for computing in terms of the resources usages. It can provide distributed computing cross intra-net or Internet. In addition, it provides scalability and all intelligent services such as real time fault handling, security and others.

39 Claims, 7 Drawing Sheets

The Layers of the Software Infrastructure for Distributed Intelligent Virtual Server

| Web | |
|---|---|
| Client Interface modules On Distributed Control Station | |
| Distributed Virtual Server modules On Distributed Control Station | |
| Service Delivery module On server units | Control interface modules On server units |

FIG. 2A

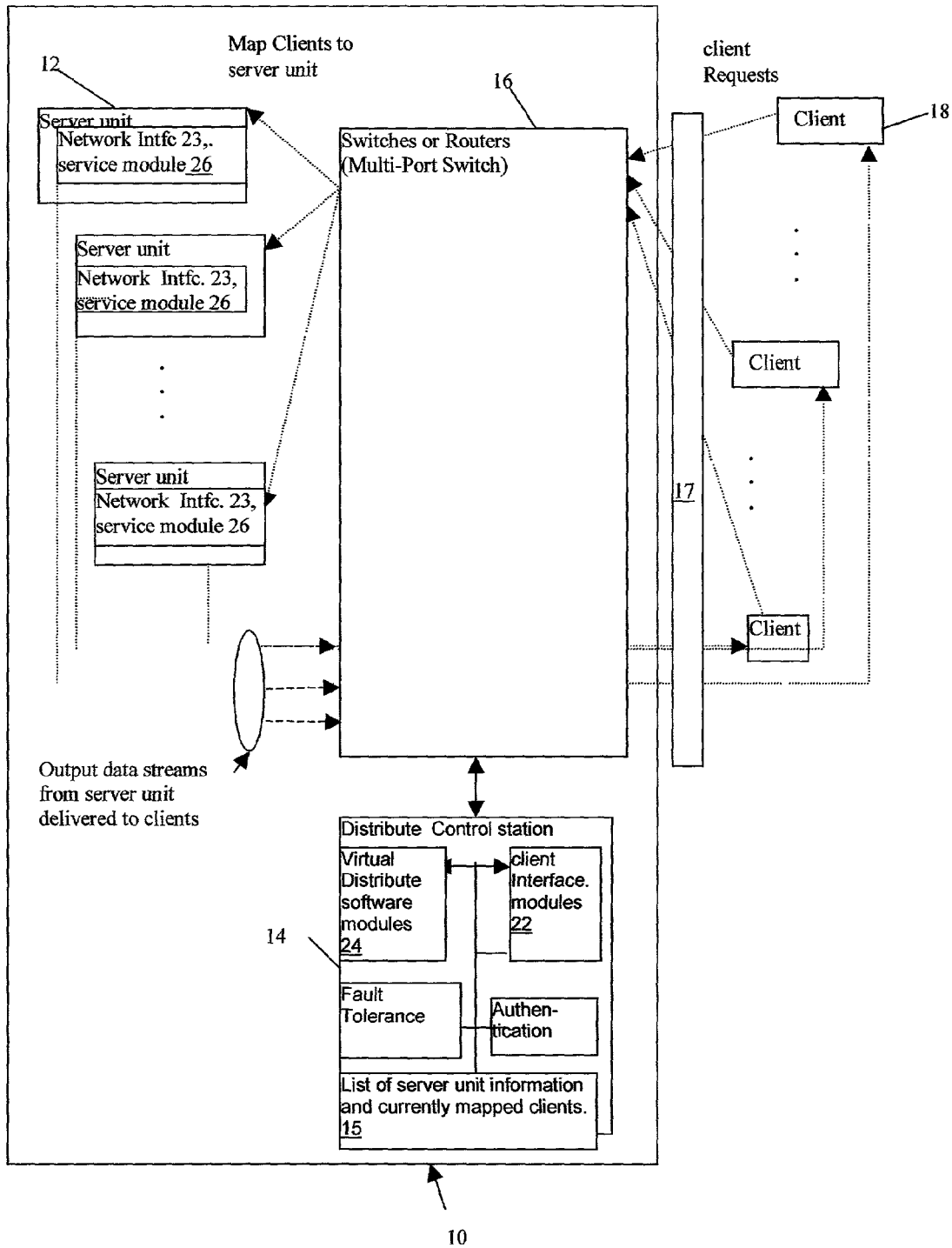
FIG. 2B - data flow with the distributed intelligent virtual server

DISTRIBUTED INTELLIGENT VIRTUAL SERVER

FIELD OF THE INVENTION

The present invention relates generally to distributed virtual server, and more particularly to distributed intelligent virtual server.

BACKGROUND OF THE INVENTION a) Basic Terminology:
   Disk Drive: Provide computer host system with block data through special cable access such as IDE or SCSI cable depends on type of disk drive.
   SAN: a storage system comprises multi-disk drives and provides computer host system with block data through Fiber optical for Fiber Channel accessing or Ethernet cable for TCP/IP/UDP accessing.
   NAS: A dedicated storage system, which comprises multiple disk drives and configured to provide specialized services such as file server, Web server, video server etc. to end user system through network media.

b) The Traditional Server:
   Currently there are two types of servers on the market one is SMP based and another is MPP based.
   SMP Based Server:
   This type of system has one operating system (OS) running on top of multiple processors (CPU). Each processor may need to compete certain system resources with other processor in order to perform a task. Therefore, It may introduce certain delay for each processor to execute a task.
   MPP Based Server:
   Other conventional servers utilize multi-node massively parallel processor (MPP) machines including a clustering together of processors that do not share resources such as memory (i.e., each CPU has its own memory). Each processor has its own operating system (OS) or part of OS. Though the CPUs do not share common memory, the node may commonly support a distributed file system on top of a group of nodes, wherein the contents are stored on the file system. This requires complex coordination between the nodes through intra-node communication channel. Hence, this will introduce delay in term of task executing by a processor. Even there is MPP clustering system do not support distributed file system, each processor on the system often still support coordinate each other to perform a portion of the task.
   All of these types of servers are very expensive and geometrically limited in a centralized location. In addition, the current the servers on Internet such as Web server, proxy server, and Web cache server are not intelligent enough such that they do not provide automatic fault handling hence they do not have the concept of virtual server.
   While these servers may still serve different computational purpose, there are many tasks, which these server may not perform efficiently such as deliver video on Internet etc, deliver the block data to host etc cross corporate intra-net and Internet. There is, therefore, a need for powerful and inexpensive server, which can distribute the computing power cross intra-net or internet, provides scalable capacity, high performance, yet still provide intelligent automatic fault handling, and security etc.

BRIEF SUMMARY OF THE INVENTION

The distributed intelligent virtual server will consist at least one distribution control station and more than one actual server units. This forms a virtual server pool by connecting distribution control station, multiple actual server units, and client system through routers/switches. (See FIG. 1A) These server units can either be individual NAS, SAN, PC, or any form of physical computer units such as midrange or mainframe computer. The distributed virtual server will be managed and controlled by the software infrastructure created by this invention, which is running mainly on distribution control station and part of it will run on each individual server units. (See FIG. 2A for the layered software infrastructure). The invented intelligent virtual server supports and manifests the following features:

The distribution control station will accept requests from clients and assign them to each individual server unit for service. After a client is assigned to a server unit by distribution control station, the server unit will serve the client directly without interference of the distribution control station. Since each server units does not share resources such as memory, system buses, networking card, and IO control card, the throughput will be higher than the conventional SMP and MPP server.
   The virtual server does not limited by the geometry location like SMP or MPP clustering system does. Each individual server units such as NAS, SAN box could be in a place of a rack mounted Cabinet, in a room, or even crossing the different regions and continentals, depending on the business's needs.
   The virtual server is more fault tolerant than the conventional server due to it has more individual operated network card and IO control card on each server units. Therefore, when a fault occurred on an individual network card or IO control card on a server unit, the rest of server units on the virtual server system still can server the majority client requests. In addition, distribution control station can provide the automatic fault handling by replacing a fault server unit with a hot spare server unit for continue operation.
   The capacity of the virtual server can be scale up by dynamically adding more server units without interrupt the operation of the virtual server. The scalability of the virtual server can meet the ever increasing demand from huge number of clients.
   Due to the virtual server unit do not have geometry limit, it can effectively save the network bandwidth. For example, to overcome the network's bandwidth limitation in delivering the video contents by using NAS, each individual NAS can be placed at different network domain, or crossing the regions and continentals. This will allow a single centralized copy of video content be replicated to these limited NAS first and all massive video requests could be distributed to these distributed NAS for video accessing.
   The cost of such virtual server could be lower than the conventional server due to often the off the shelf, lower cost NAS or SAN or other can be used.
   The example of such distributed virtual server would be distributed video server, virtual SAN, and others. The traditional network management system do not distribute the computing power. The traditional distributed computing is limited in a centralized location such as SMP or MPP system. The current Web based servers do not have concept of the virtual server and hence is not intelligent enough to provide automatic fault handling etc.

BRIEF DESCRIPTION OF THE DRAWINGS

These and other features, aspects and advantages of the present invention will become understood with reference to the following description, appended claims and accompanying figures where:

FIG. 2A) shows the layered software infrastructure in the example distributed virtual server of FIG. 1A.

FIG. 2B) shows another data flow in the example distributed virtual server of FIG. 1A;

In the drawings, like elements are designated by like reference numbers.

DETAILED DESCRIPTION OF THE INVENTION

Figure 1A:
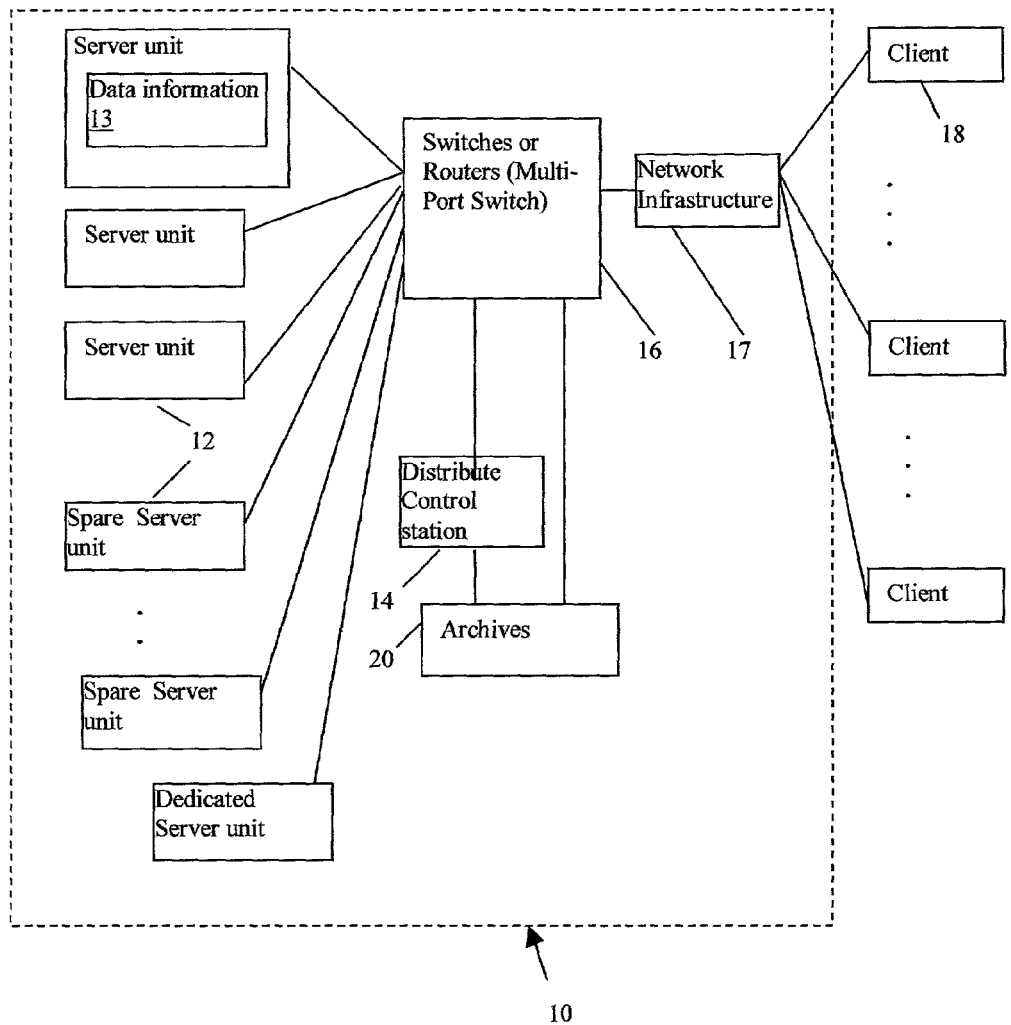
FIG. 1A) shows an example simplified block diagram of an embodiment of a distributed virtual server including NAS, SAN or other server units according to the present invention.

FIG. 1A shows a simplified block diagram of a distributed intelligent virtual server (10) according to this present invention. The distributed virtual server (10) comprises one or more server units (12) connected to a distribution control station (14) via one or more switches or routers (16). One or more client devices (e.g., personal computers (18) are connected to the distribution control station (14) via a communication network (17). Each server unit (12) stores data (13) for accessing by clients (18), wherein the distribution control station (14) maintain a list (15) (FIG. 2B) of information (13) from each sever units (12).

In one example, the distribution control station (14) hosts a virtual block data server (SAN) Web site to perform administration tasks and distribute client's disk volumes requests to specific server units (12) up to the maximum concurrent client volume requests that each block data server unit (12) can handle. In another example for the IP based distributed virtual SAN (block data server), the distribution control station (14) maintains a list (15) of information (13) from each SAN units (12), which will be the list of volumes with specific type, size, address of the block data as well as the IP address of each block data server units.

The same principle could be applied to the distributed video server and other. In third example, the distribution control station (14) hosts a virtual video server Web site to perform administration tasks and distribute client's video requests to specific video server units (12) up to the maximum concurrent client video requests that each video server unit (12) can handle. In fourth example of distributed video server system, the distribution control station (14) maintains a list (15) of video files information (13) from each server units (12).

Figure 1B:
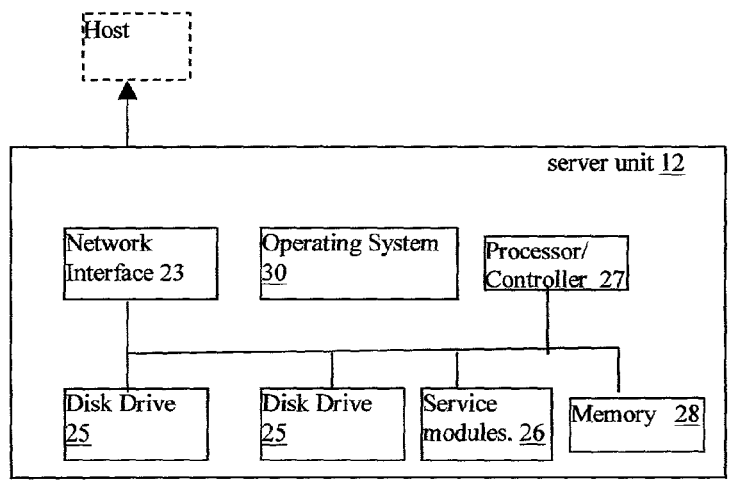
FIG. 1B) shows an example block diagram of an embodiment of an NAS, SAN or other server unit.

In one example shown in FIG. 1B, a server unit (12) comprises a system including one or more storage media such as disk drives (25), and network interface (23) such as Gigabits or 100 BT Ethernet card for user access to storage media (25). A server unit (12) also contains a simplified and dedicated computer system, which including processor (27) and memory (28) to provide specialized services such as e.g. used for file server, email server, or Web server. Due to its simplicity and specialized operating system (30) environment that provides specialized service, a server unit (12) can provide users a more efficient and affective way to access data than a typical computer system. The service software modules (26) provide the dedicated service and deliver data streams to client (18). The software service modules (26) also provide server unit (12) configuration information to distribution control station (14).

The network infrastructure (17) can comprise e.g. the Internet or LAN/WAN (Local Area Network/Wide Area Network) infrastructure between the clients (18) and the virtual server system (10). For example, a client system (18) located in France is connected to the virtual server (10) in U.S.A. by a LAN/WAN network infrastructure (17) (e.g., Internet).

In one version, upon receiving requests for data volume from clients (18), the distribution control station (14) maps a fixed number of clients (18) to each specific server units (12) and allows each server units (12) to deliver data streams directly to the corresponding group of clients (18). The server units (12) are clustered together by switches or routers (16). Each server units (12) runs independently and as such there is no need for communication between the server units (12).

In one example, the distributed virtual block data server (SAN) (10) provides a virtual data volume pool (15) (FIG. 2B) for several host clients. Initially, the distribution control station (14) collects reservations of up to 1000 Tera Bytes of data pool from each individual block data server units (SAN boxes) (12). Each server units (12) can provide multiple data volumes to multiple clients (18). The distribution control station (14) assigns maximum number of clients (18) to each server units (12) based on the maximum number of data volumes each server units (12) can deliver. The distribution control station (14) can dynamically add more server units (12) under its control if client (18) requests for data volume exceeded 1000 Tera Bytes of data limit in pool due to all volumes have be assigned to other client (18).

FIG. 2A shows a layered software infrastructure. As indicated in FIG. 2B, with this infrastructure, the client (18) initially accesses the virtual server (10) through client interface modules (22) on distribution control station (14). The client interface modules (22) send client information to virtual server software module (24) on distribution station (14). The virtual server software module (24) get mapping information for all server units (12) in virtual server (10) via network and communicating to the server service software modules (26) on server unit (12). The virtual server software module (24) selects and provides mapping information of a specific server unit (12) to client interface modules (22). The client interface modules (22) sends the mapping information to client (18). The client (18) then establishes the communication channel directly to a specific server unit (12) within virtual server (10). The server units (12) consists dedicated server service software module (26) (FIG. 1B) to provide the required service and deliver the data streams to client (18). With this infrastructure, only part of virtual server software module (24) on distribution control station (14) need to be customized in order to communicate to server service software modules (26) on server unit (12).

FIG. 2B shows an example data flow diagram between the distributed virtual server (10) and the clients (18), wherein data flow is shown in dashed lines. The virtual server (10) includes client interface modules (22) on distribution control station (14) which accepts requests from clients (18) via Web and passes client requests to a virtual server module (24) on distribution control station (14). The software virtual server module (24) in the distribution control station (14) monitors status of one or more server units (12) and selectively provides mapping between each requesting client (18) to a server unit (12). A server service module (26) in each server units (12) provides service for delivering served data from/to the server unit (12) through the network by the requested client (18) (e.g., streaming, or block data)

Servers Unit

Each server unit (12) can provide essentially the same data stream rate (throughput) to the assigned clients (12). Each thread, which handling client request in the server unit (12) can share equal amount of data bandwidth provided by the server unit (12) as other threads, which handling similar client requests in that server unit (12).

In the following sections, example requirements for a server unit (12) for use in the virtual server (10), are provided.

Basic Requirement

Suitable server units such as NAS, SAN, or PC and computers (12) for use in the present invention provide concurrent data streams. Such server units (12) can be used in e.g. supporting applications such as providing block data to host system, providing video or audio application of online movie theatre, online educational training class, video on demand (VoD) etc. to end users on client (18).

Volume Capacity

Depending on application, the specific volumes requirements must be met. For example, a single block data server (12) (SAN) may have 800 Gbyets of capacity, which may be suitable for host's needs. Another example, a network attached storage (12) (NAS) may require 300 GB volume to host 200 hours 3 Mbits/sec movie etc.

Content Distribution and Delivery Method

The distribution control station (14) "hides" the server units (12) from the clients (18), whereby the clients interface to the distribution control station (14) and are transparently and selectively provided with requested data service streams from the multiple server units (12). The clients (18) access only one point, the distribution control station (14), and based on client requests the distribution control station (14) selectively assigns different server units (12) to different clients (18).

In one embodiment, the distribution control station (14) maintains a list (15) of data information (13) such as volumes information or video contents stored on each server units (12), and selectively provide the information of a appropriate server unit to a client (18).

As shown in FIG. 2B, the clients (18) communicate with the distribution control station (14), and the distribution control station maps clients to appropriate server unit (12) (via the switches/routers), wherein each server unit (12) provides data streams to one or more mapped clients (18) independent of other server units (12) (e.g., FIG. 2B). The distribution control station (14) can be exposed to the clients (18) through a Web browse. As such, the distribution control station (14) provides infrastructure to organize all server units (12) to form a distributed virtual server (10).

Figures 3A, 3B:
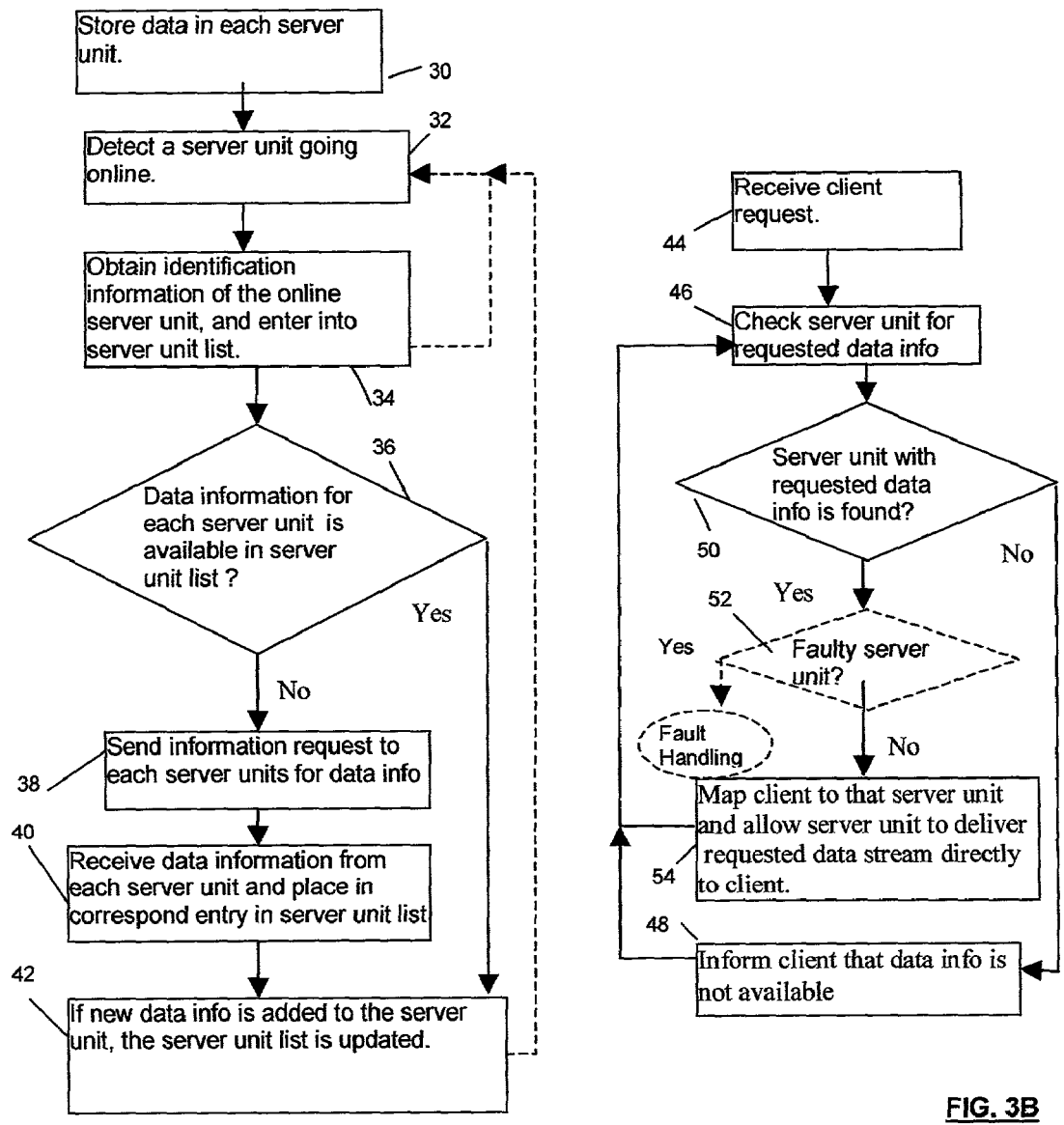
FIG. 3A) shown an example flowchart of the steps of obtaining and maintaining server unit data information.
FIG. 3B) shows an example flowchart of an embodiment of the steps of providing data service according to the present invention.
Figure 3C:
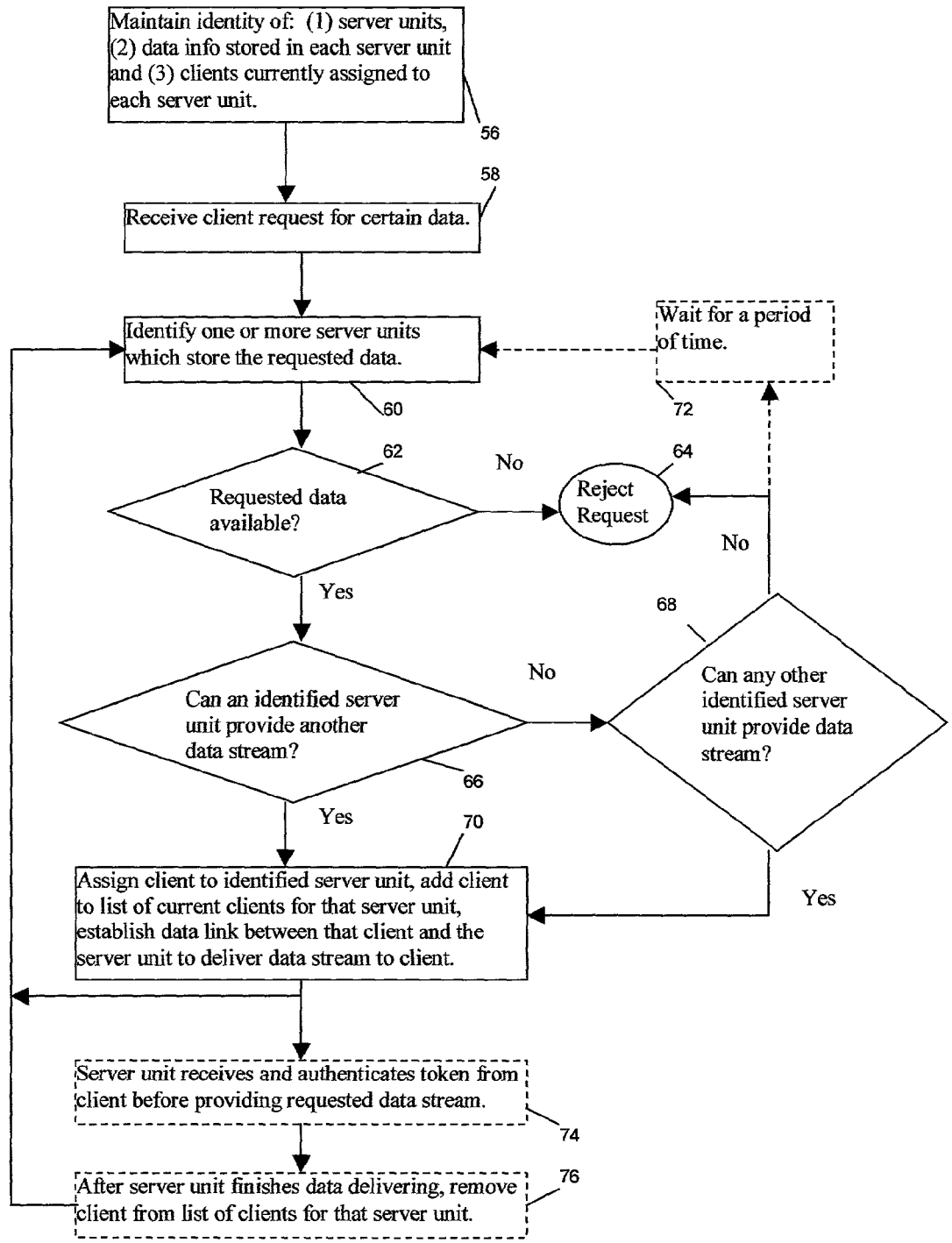
FIG. 3C) shows an example flowchart of an embodiment of the steps of providing data service according to the present invention.
Figure 4:
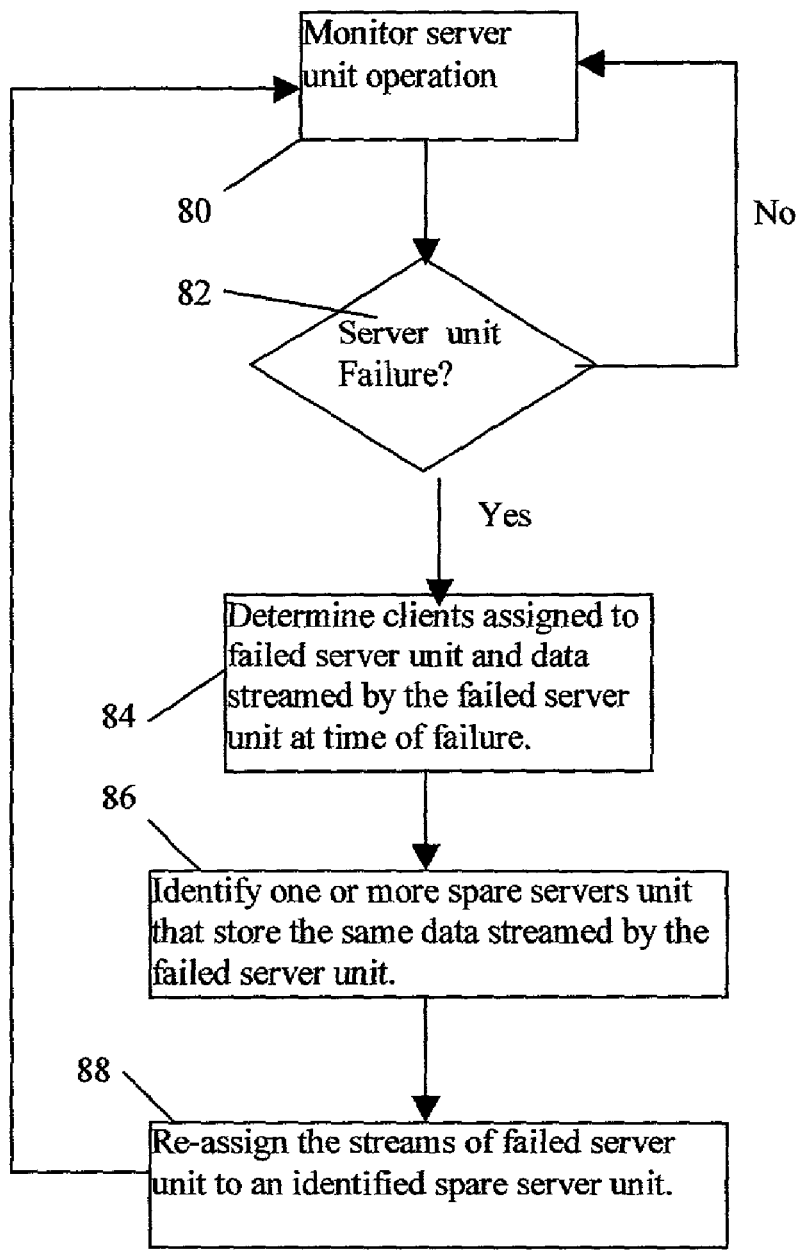
FIG. 4) shows an example flowchart of an embodiment of the steps of fault tolerance in a intelligent virtual server according to the present invention.

Referring to FIGS. 3-4, example flowcharts of an embodiment of the steps of content delivery according to the present invention is shown. In one version, the distribution control station (14) is configured to perform said steps.

Referring to example steps in FIG. 3A, the server units (12) are interconnected to the distribution control station (14), and data are stored in each server units (12) (step 30). Each server units (12) that comes on line is detected (step 32), and identification information for the server unit (e.g., IP address) is obtained and entered into the server unit list (15) (step 34). If data information for an server unit (12) is not in the server unit list (step 36), then an information request is sent to the server unit (12) for data information (step 38). The data information received from each server units (12) is stored in the server unit list (15) on distribution control station for the corresponding server unit (12) (step 40). Further, if new data information is added to a server unit (10), the server unit list (15) on distribution station (14) is updated accordingly (step 42).

Referring to steps in FIG. 3B, upon receipt of request from a client (18) for data (e.g., video content, or specific size of volume) (step 44), the server unit list (15) on distribution control station (14) is checked for the requested data (step 46). If a server unit (12) with the requested data is not found, the client (18) is informed that the requested data is currently unavailable (step 48). Otherwise, if such a server unit (12) is found (step 50), it is optionally determined if the found server unit (12) is faulty (step 52). If so, fault handling is performed (described further below), otherwise, the requesting client (18) is mapped to the found server unit, and the server unit streams the requested data directly to that client (18) (step 54).

Referring to FIG. 3C, in another example, the distribution control station (14) maintains the server unit list (15), a list of server units (12), list of data information on each server unit (12), and list of clients currently mapped/assigned to each server units (12) for streaming (step 56). Upon receiving a client (18) request for data information (step 58), an attempt is made to identify from the server list (15), one or more server units (12) that store the requested data information (step 60). If the requested data information is unavailable (step 62), then the request may be rejected and client (18) is so informed (step 64).

If one of the data identified server units (12) can provide another data stream (depending on the maximum number of data streams and bandwidth that the server unit can provide) (step 66, 68), then the request is continually assigned to that identified server unit, and client identification added to the client list for that server unit (12) (step 70). Otherwise, either the request is rejected, or optionally after a time period the ability of said identified server unit (12) is checked to assign the request to (step 72). As described hereinbelow, the assigned server unit (12) can optionally authenticate the client before providing the requested data information via a data stream (step 74). Further, optionally, after a server unit (12) finishes streaming to a client (18), the client is removed from the server unit list (15) as assigned to that server unit (step 76).

Authentication

In one version of the distributed virtual server (10), each server units (12) authenticates a token from a client (18) assigned to that server unit (12). In one example, the token is the IP address of the client (18), but it can be any other unique identifying information, which provide by distribution control station (14) to server unit (12) after receiving client (18) request. At the time a client (18) requests data information (e.g., reservation a volume or video content), the distribution control station (14) optionally sends back to that client (18) a token (a ticket) indicating which server unit (12) the distribution control station (14) has mapped/assigned the client (18) to for receiving streaming data information from the assigned server unit (12). In addition, the distribution control station (14) also send a token to server unit (12) to indicate which client can be authorized to that server unit (12). Then, upon communication with the assigned client (18), each server unit (12) receives a token from that client (18), and authenticates by using authentication information previously provided to the server unit (12) by the distribution control station (14) as to the identity of that client (18).

As such, each assigned client (18) automatically starts to retrieve data stream based on the token received. Each server units (12) authenticates the assigned client (18) based on the information received from distribution control station (14), and delivers data streams directly to the client (18) upon authentication.

Fault Handling

The distributed virtual server (10) can further provide fault handling. Each individual server units (12), including several disk drives (25), can be configured with e.g. RAID1 or RAID5 etc. This provides data protection at the disk level in each server units, against fault of a single disk. Further, as shown by example steps in FIG. 4, one or more spare server units (12) may store same data information as one or more servers units (12), whereby the virtual server (10) provides server unit's fault handling (e.g. due to a server unit network fault or a IO control card fault, or other). In one example implementation, the distribution control station (14) monitors all server units (12) operations (step 80), and upon detecting an server unit failure (step 82), determines the data information provided to clients mapped to the faulty/failed server unit (step 84), utilizes a spare server unit (12) that includes the same data information (step 86) to take the assigned workload off a faulty server unit (12) and provide data information to the client assigned to the faulty server unit (step 88). The ratio between the number of spare server units (12) and the total number of server units (12) is selected based on cost and level of fault tolerance desired.

Scalability

A distributed virtual server (10) according to the present invention is scalable by dynamically adding or removing server units (12) without stop the normal virtual server's (10) operation depending on data bandwidth, data rate and data throughput requirements. This allows the virtual server (10) to support a wide range of needs and clients (18) from small to large, and provide a scalable distributed virtual server for virtually unlimited number data streams.

Network Interfaces

Each server units (12) uses a network interface for communication with the distribution control station (14) and the clients (18) via a communication network (17). An example is IP/Ethernet connection, wherein the IP switches/routers (16) are used to deliver the data streams from the server units (12) to clients (18) such as personal computers via the Internet (IP Internet connection). Other suitable connection include e.g. Ethernet to ADSL router to deliver the data stream from server units (12) to TV units with a set Top box via e.g. cable. Other network interfaces such Fiber optical interface for Fiber Channel are possible and contemplated by the present invention.

Switches

The number of server units (12) and switches/routers (16) depends on the bandwidth required of the virtual server (10). For example, in a switch (16) connected to a 1-Gitabit Internet port for client connection, and to eight or twelve 100-bit of server unit ports, each server units (12) is configured with 100-bits/sec Ethernet card. A data transfer forwarder sends information to the corresponding 100-bits port for each server units (12). The number and type of switches (16) further depends on the number of server units (12) connected to each switch (16), and data streaming bandwidth and rate requirements. The example switches or routers are manufactured by Cisco™ and 3 Com™.

Advantages

According to the present invention server units (12) are used scalably to efficiently deliver data streams to clients (18), under the control of one (or more for fault handling) distribution controls station (14) that preferably provide a single point of contact/interface to the clients (18) via the network (17). As more bandwidth and data streams are required, more server units (12) and routers/switches (17) are added to the virtual server (10) to deliver more data streams. Because each server unit (12) operates independent of other server units (12) without sharing internal resources, there is no resource contention in a virtual server (10) according to the present invention that exists in conventional servers such as those utilizing SMP, or MPP machines. Further, as there is no need for intra-node routing and communication, there is no communication bottleneck between the server units (12) in a virtual server (10) according to the present invention, as exists in conventional servers such as those using MPP, or SMP systems. In addition, the virtual server (10) has no geometric restriction each individual server unit (12) can be placed in a single rack mounted cabinet or in a room, or cross the region or continental. This allows saving network bandwidth effectively. The per data stream price is low, specially for delivering a large number of streams to end users when using low cost NAS. In addition, unlike the centralized server such as SMP or MPP, the distributed virtual server has more independently operated network cards and 10 cards, therefore, in case of a single card broken will not bring the entire virtual server malfunction, instead, majority part of the virtual server can still operating normally. Besides, the automatic fault handling can be provided.

Distribution Control Station

Figure 5:
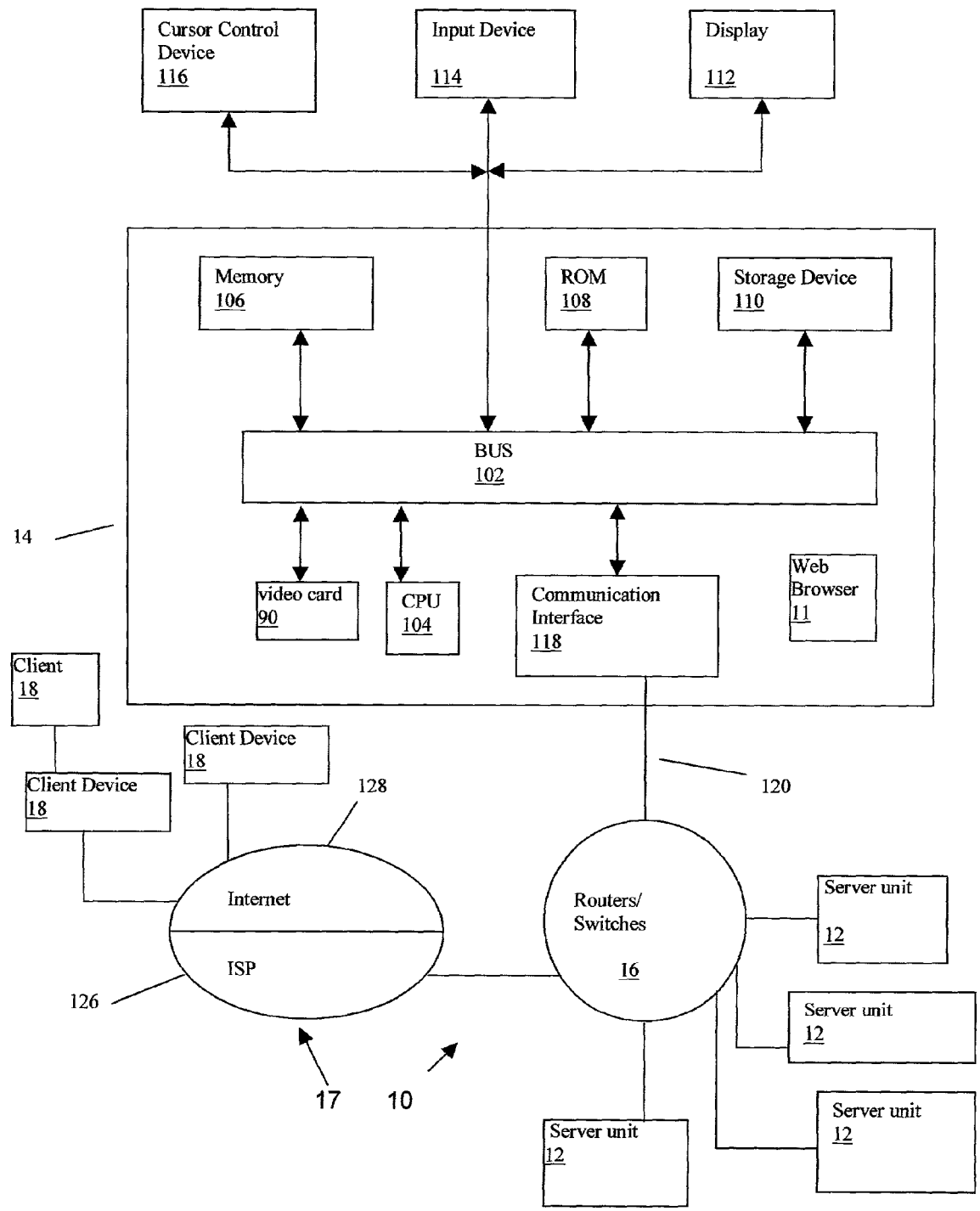
FIG. 5) shows another example block diagram of the intelligent virtual server of FIG. 1A with a more details of the distribution control.

FIG. 5 shows a more detailed block diagram of the virtual server (10) of FIG. 1A, connected to client (18) via the network (17). In one example, the distribution control station (14) can comprise a computer system with computation and communication capacity depending on the number of data streams requests it can handle. Such a computer system is configured software to assigns/map clients (18) and server units (12) as described herein, whereby each server units (12) transparently delivers a data stream to an assigned/corresponding client (18). In one example, Web server technology provides data streaming link between each server units (12) and corresponding client (18).

In the example of FIG. 5, the distribution control station (14) comprises a computer system which includes a bus (102) or other communication mechanism for communicating information, and a processor (CPU) (104) coupled with the bus (102) for processing information. The computer system (14) also includes a main memory (106), such as a random access memory (RAM) or other dynamic storage device, coupled to the bus (102) for storing information and program instructions to be executed by the processor (104). The main memory (106) also may be used for storing temporary variables or other intermediate information during execution or instructions to be executed by the processor (104). The computer system (14) further includes a read only memory (ROM) (108) or other static storage device coupled to the bus (102) for storing static information and instructions for the processor (104). A storage device (110), such as a magnetic disk or optical disk, is provided and coupled to the bus (102) for storing information and instructions. The bus (102) may contain, for example, thirty-two address lines for addressing video memory or main memory (106). The bus (102) can also include, for example, a 32-bit data bus for transferring data between and among the components, such as the CPU 104, the main memory 106, video memory and the storage media (110). Alternatively, multiplex data/address lines may be used instead of separate data and address lines.

In one embodiment, the CPU (104) comprises a microprocessor manufactured by Motorola®, such as the 680×0 processor or a microprocessor manufactured by Intel®, such as the 80×86, or Pentium® processor, or a SPARC® microprocessor from Sun Microsystems®. However, any other suitable microprocessor or microcomputer may be utilized. The main memory (106) can comprise dynamic random access memory (DRAM). And video memory (not shown) can comprise a dual-ported video random access memory.

The computer system (14) may be coupled via the bus (102) to a display (112), such as a cathode ray tube (CRT), for displaying information to a computer user. An input device (114), including alphanumeric and other keys, is coupled to the bus (102) for communicating information and command selections to the processor (104). Another type of user input device comprises cursor control (116), such as a mousse, a trackball, or cursor direction keys for communicating direction information and command selections to the processor 104 and for controlling cursor movement on the display (112). This input device typically has two degrees of freedom in two axes, a first axis (e.g., x) and a second axis (e.g., y) that allows the device to specify positions in a plane.

According to one embodiment of the invention, the steps of the processes of the present invention is provided by computer systems (14) in response to the processor (104) executing one or more sequences of one or more instructions contained in the main memory (106). Such instructions may be read into the main memory (106) from another computer-readable medium, such as the storage device (110). Execution of the sequences of instructions contained in the main memory (106) causes the processor (104) to perform the process steps described herein. One or more processors in a multi-processing arrangement may also be employed to execute the sequences of instructions contained in the main memory (106). In alternative embodiments, hard-wired circuitry such as Application Specific Integrated Circuit (ASIC) may be used in place of or in combination with software instructions to implement the invention. Thus, embodiments of the invention are not limited to any specific combination of hardware circuitry and software.

The term "computer-readable medium" as used herein refers to any medium that participated in providing instructions to the processor 104 for execution. Such a medium may take may forms, including but not limited to, non-volatile media, volatile media, and transmission media. Non-volatile media includes, for example, optical or magnetic disks, such as the storage device (110). Volatile media includes dynamic memory, such as the main memory (106). Transmission media includes coaxial cables, copper wire and fiber optics, including the wires that comprise the bus (102). Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor (104) for execution. For example, the instructions may initially be carried on a magnetic disk of a remote computer. The remote computer can load the instructions into its dynamic memory and send the instructions over a telephone line using a modem. A modem local to the computer system (14) can receive the data on the telephone line and use an infrared transmitter to convert the data to an infrared signal. An infrared detector coupled to the bus (102) can receive the data carried in the infrared signal and place the data on the bus (102). The bus (102) carries the data to the main memory (106), from which the processor (104) retrieves and executes the instructions. The instructions received from the main memory (106) may optionally be stored on the storage device (110) either before or after execution by the processor (104).

The computer system (14) also includes a communication interface (118) coupled to bus the (102). The communication interface (118) provides a two-way data communication coupling to a network link (120) that is connected to routers (16). For example, the communication interface (118) may be an integrated services digital network (ISDN) card or a modem to provide a data communication connection to a corresponding type of telephone line, which can comprise part of the network link (120). As another example, the communication interface (118) may be a local area network (LAN) card to provide a data communication connection to a compatible LAN. Wireless links may also be implemented. In any such implementation, the communication interface (118) sends and receives electrical electromagnetic or optical signals that carry digital data streams representing various types of information.

The network link (120) typically provides data communication through one or more networks to other data devices. For example, the network link (120) may provide a connection through a local network to a host/server computer or to data equipment operated by an Internet Service Provider (ISP) (126) via switched (16). The ISP (126) in turn provides data communication services through the world wide packet data communication network now commonly referred to as the "Internet" (128). The Internet (128) uses electrical electromagnetic or optical signals that carry digital data streams. The computer system (14) further includes web server (11) for providing e.g. a user interface to the clients (18) for requesting data streams from the virtual server (10). In one example said user interface can include a list of available video content files in the virtual video server (10) and ways of selecting content files for viewing, including optionally payment terms.

The computer system (14) can send messages and receive data, including program code, through the communication interface (118). In the Internet example, clients (18) can transmit code (e.g., program instructions, HTML, etc.) for an application program through the Internet (128), the ISP (126), and communication interface (118).

The example versions of the invention described herein can be implemented as logical operations in a distribution control station (14). The logical operations of the present invention can be implemented as a sequence of steps executing on distribution control station (14). The implementation is a matter of choice and can depend on performance of the distribution control station (14) implementing the invention. As such, the logical operations constituting said example versions of the invention are referred to for e.g. as operations, steps or modules.

Miscellaneous

The present invention has been described in considerable detail with reference to certain preferred versions thereof; however, other versions are possible. Therefore, the spirit and scope of the appended claims should not be limited to the description of the preferred versions contained herein.

What is claimed is:

1. A control system for a virtual server comprising:

a plurality of physical resources including CPU, memory, storage and network devices, the control system interconnecting and operatively coupled to one or more server units via a network of LAN, Intranet, and Internet to dynamically form a scalable virtual server for providing one or more services to one or more clients via communication links of the network, wherein the control system including a client interface for receiving service requests from one or more clients via communication links over the network, and including a virtual distributor communicating to each server unit and coupling to the client interface for selectively distributing each received client service request to an identified available server unit having the requested service data, and further for the identified server unit providing the service data to the requested client via the communication link independent of other server units; wherein the control system is also maintaining a client and server unit mapping list, and authenticating each client before allowing the client to access the server units, controlling fault handling by detecting fault server unit and deploying spare server units for providing service replacement to the clients, and monitoring and managing the scalable virtual server with capability of controlling the dynamic adding or removing one or more server units without interrupting normal operation of the scalable virtual server.

2. An intelligent central controlled distributed scalable virtual machine (server) comprises:

a control system ("control station") comprising a plurality of physical resources including CPU, memory, storage and network communication devices; and one or more server units, and each one is stored with services and data information for providing services; wherein the control system interconnecting and controlling each server unit over a network of LAN, Intranet, and Internet to dynamically form a virtual server, and providing centralized operations for the virtual server; wherein the control system including a client interface for receiving service requests from one or more clients via the communication links of the network, and including a virtual distributor communicating to each server unit and coupling to the client interface for selectively distributing each received client service request to an identified available server unit having the requested service data, and further for the identified server unit providing the service data to the client via the communication link of the network independent of other server units; wherein the control station is also maintaining a client and server mapping list, authenticating each client before allowing the client to access server units, controlling fault handling by detecting any fault server unit and deploying spare server unit for providing service replacement to the clients, and monitoring and managing the virtual server with capability of controlling the dynamic adding or removing one or more server units without interrupting normal operation of the virtual server.

3. The virtual server of claim 2, wherein said each server unit storing service and data information further includes:

configuring each server unit with a service control for communicating to the control system and each client via the network, and for providing corresponding services including storage volume and block data services, video service, file service, web service, and email service.

4. The virtual server of claim 3, further includes configuring a virtual server with one or more server units for providing one or more services.

5. The virtual server of claim 3 further includes configuring a virtual server with one or more server units for providing a dedicated service.

6. The virtual server of claim 2, wherein said server unit further includes:

providing at least one server unit to be configured with one or more data storage devices and a storage control for coordinating access to the data storage devices; wherein, said server unit includes video server, file server, email server, web server, PC ("personal computer"), NAS, and SAN.

7. The virtual server of claim 2, wherein said server units further includes:

facilitating at least one server unit concurrently providing multiple service data streams to multiple clients up to its maximum concurrent service data streams that the server unit can provide.

8. The virtual server of claim 7, wherein said server unit further includes:

providing service for reading data from said server unit and sending the data to the requesting client via a communication link; and providing service for receiving data form client and write to the server unit's storage media.

9. The virtual server of claim 7 wherein said server unit further includes:

providing each thread sharing equal amount of data bandwidth with other threads in a server unit if said threads handling similar client requests for the server unit.

10. The virtual server of claim 7, wherein said server unit further includes:

providing service in response to the control station's request for the status, identification, and configuration information of the server unit.

11. The virtual server of claim 2, wherein said control station interconnects and controls each server unit further includes:

interconnecting a said control station and one or more said server units via one or more switches and routers to form a said virtual server on a Intranet to be accessed by the plurality of clients via said network of Internet, Intranet or LAN.

12. The virtual server of claim 11 further includes:
interconnecting a said control station and one or more said server units via a switch to form a said virtual server on a LAN to be accessed by the clients via the network of LAN, Intranet or Internet.

13. The virtual server of claim 11 further includes:
interconnecting a said control station and one or more said server units via one or more switches and routers to form a said virtual server over internet to be accessed by the clients via said network of LAN, intranet or internet.

14. The virtual server of claim 2, wherein said providing services to clients via communication links further includes:
providing communication connections including IP to ADSL router to deliver service data stream from the server unit to the plurality of clients equipped with TV displaying unit.

15. The virtual server of claim 2 wherein said providing services to clients via communication links further includes:
providing communication connections including IP switch and router to deliver service data stream from the server unit to the plurality of clients equipped with IP network interface.

16. The virtual server of claim 2, wherein said controlling the dynamic adding or removing one or more server units further includes:
detecting each server unit going online; obtaining the identification, configuration, and data information from each server unit; and adding the identification, configuration, and data information of each server unit into a server unit information list on the control station as the information of a server unit pool of the virtual server.

17. The virtual server of claim 16 further includes
controlling dynamically adding one or more new server units into the server unit pool in response to the demand for the virtual server to process more client requests when each server unit of the virtual server has reached its maximum allowed concurrent service data streams.

18. The virtual server of claim 16 wherein said server unit information list further includes:
updating the server unit information list on the control station in response to the requirement of managing the operation and monitoring the changing status of each server unit.

19. The virtual server of the claim 16, further includes:
dynamically adding or removing server units for the virtual server pool of the scalable virtual server in response to the data bandwidth, data rate, and data throughput requirement of the virtual server.

20. The virtual server of claim 2, wherein said client interface of the control station further includes:
exposing one or more services information of the virtual server to each client in response to the requirement of providing one or more services, wherein said exposing includes exposing services information to each client's web browser.

21. The virtual server of claim 2, wherein said control station further provides
hosting the virtual server's web site for facilitating admin users performing administration tasks for the virtual server via web.

22. The virtual server of claim 2 wherein said maintaining a client and server mapping further includes:
receiving a client request and assigning the request to an identified available server unit, which is capable to provide the requested service data stream to the client;
adding information of the identified server unit and the assigned client into a mapping list; and
updating the mapping list by removing a client from the assigned server unit in response to the server unit finishing the requested service to the client.

23. The virtual server of claim 2, wherein said providing fault handling further includes:
providing one or more spare server units in the virtual server pool to be stored with corresponding data for providing service replacement to each corresponding server unit.

24. The virtual server of claim 2 wherein said providing fault handling further includes the steps of:
(1) detecting a fault in a server unit, which currently in providing requested data to each client;
(2) identifying a spare server unit storing that requested data; and
(3) selectively re-establishing said data stream between each client and the spare server unit storing the requested data such that the spare server unit provides the service replacement data stream to each client via the communication link independent of other server units.

25. The virtual server of claim 2 wherein said receiving service requests from one or more clients further includes steps of:
receiving authentication information from each client, verifying the authentication information, and providing the requested data streams to the client only if the authentication information is verified.

26. The virtual server of claim 2, wherein said distributing each received service request further includes:
means for communicating content to a plurality of clients, comprising:
(a) means for providing multiple said server units to be controlled by the control station and dynamically form a virtual server;
(b) means for storing data information on each server units for accessing by one or more clients;
(c) means for receiving a request for data information from a client via a communication link;
(d) means for selecting one of the server units that stores the requested data information;
(e) means for establishing a data link between that client and the selected server unit; and
(f) means for providing the requested data from the selected server unit to the requesting client via the communication link, independent of other server units.

27. The virtual server of claim 2, wherein said scalable virtual server further includes
providing the control station to be configured with computation and communication capacity for supporting the designated number of client requests.

28. The virtual server of claim 2, wherein said providing one or more services to each client via communication links further includes:
said communication links includes wireless and non-wireless communication links.

29. The virtual server of the claim 2, wherein said central controlled accessing of the control station further includes:
hiding said each server unit from one or more clients and exposing the control station as an accessing point of the virtual server for the clients' centralized accessing of the virtual server.

30. The virtual server of the claim 2, wherein said control station distributes each received service request to an identified server unit further includes:

distributing client requests to the identified server unit up to the maximum service data streams that server unit can provided.

31. The virtual server of the claim 2, wherein said switches and routers further includes:

deploying the numbers of switches and routers to the virtual server in response to the requirement of the bandwidth and data streams capacity for the scalable virtual server.

32. A method for communicating content to a plurality of clients, comprising the steps of:

(a) providing multiple server units to be controlled by a control station for dynamically forming a virtual server;

(b) storing data information on each server units for accessing by one or more clients;

(c) instructing the control station to receive a request for data information from a client via a communication link;

(d) instructing the control station to select one of the server units that stores the requested data information;

(e) instructing the selected server unit to establish said data link between that client and the selected server unit; and (f) instructing the selected server unit providing the requested data from the selected server unit to the requesting client via the communication link, independent of other server units.

33. The method of claim 32, wherein step (d) further includes the steps of instructing the control station to determine if one of the said server unit stores the requested data information, and if so, selecting that server unit and performing steps (e) and (f).

34. The method of claim 32, wherein:

said step (a) further includes the steps of instructing the control station obtaining identification information from each server unit and maintaining that said information;

said step (b) further includes the steps of instructing the control station obtaining and maintaining said data information corresponding to each identified server unit; and said step (d) further includes the steps of instructing the control station checking the data information to determine if one of the identified said server unit stores the requested data information, and if so, selecting that server unit and performing steps (e) and (f).

35. The method of claim 32, wherein:

said step (a) further includes the steps of providing one or more spare server units to be controlled by the control station;

said step (b) further includes the steps of storing corresponding data on said spare server units for service replacement; and the method further including the sequence of steps of:

(g) instructing the control station detecting a fault in a server unit currently providing requested data to a client;

(h) instructing the control station identifying a spare server unit storing that requested data; and (i) instructing the control station selectively re-establishing said data stream between that client and the spare server unit storing the requested data, wherein that spare server unit provides the data stream to the client via the communication link, independent of other server unit units.

36. The method of claim 32, wherein step (e) further includes:

the steps of authenticating the identity of the client before providing the requested service data to the client.

37. The method of claim 32, wherein step (f) further includes:

the steps of receiving authentication information from that client, verifying the authentication information, and providing the requested data streams only if the authentication information is verified.

38. The method of claim 32, wherein:

said step (c) further includes the steps of: instructing the control station receiving multiple requests for data streams from multiple clients;

said step (d) further includes the steps of: for each requesting client, instructing the control station selecting one of the server units that stores the data streams requested by that client;

said step (e) further includes the steps of: establishing a data stream between each requesting client and the selected server unit for that client; and said step (f) further includes the steps of providing each requested data stream from a selected server unit to the requesting client via the corresponding communication link, independent of other server units.

39. The method of claim 38, wherein said multiple requests further includes said multiple requests can be random in time.

* * * * *